UNITED STATES PATENT OFFICE.

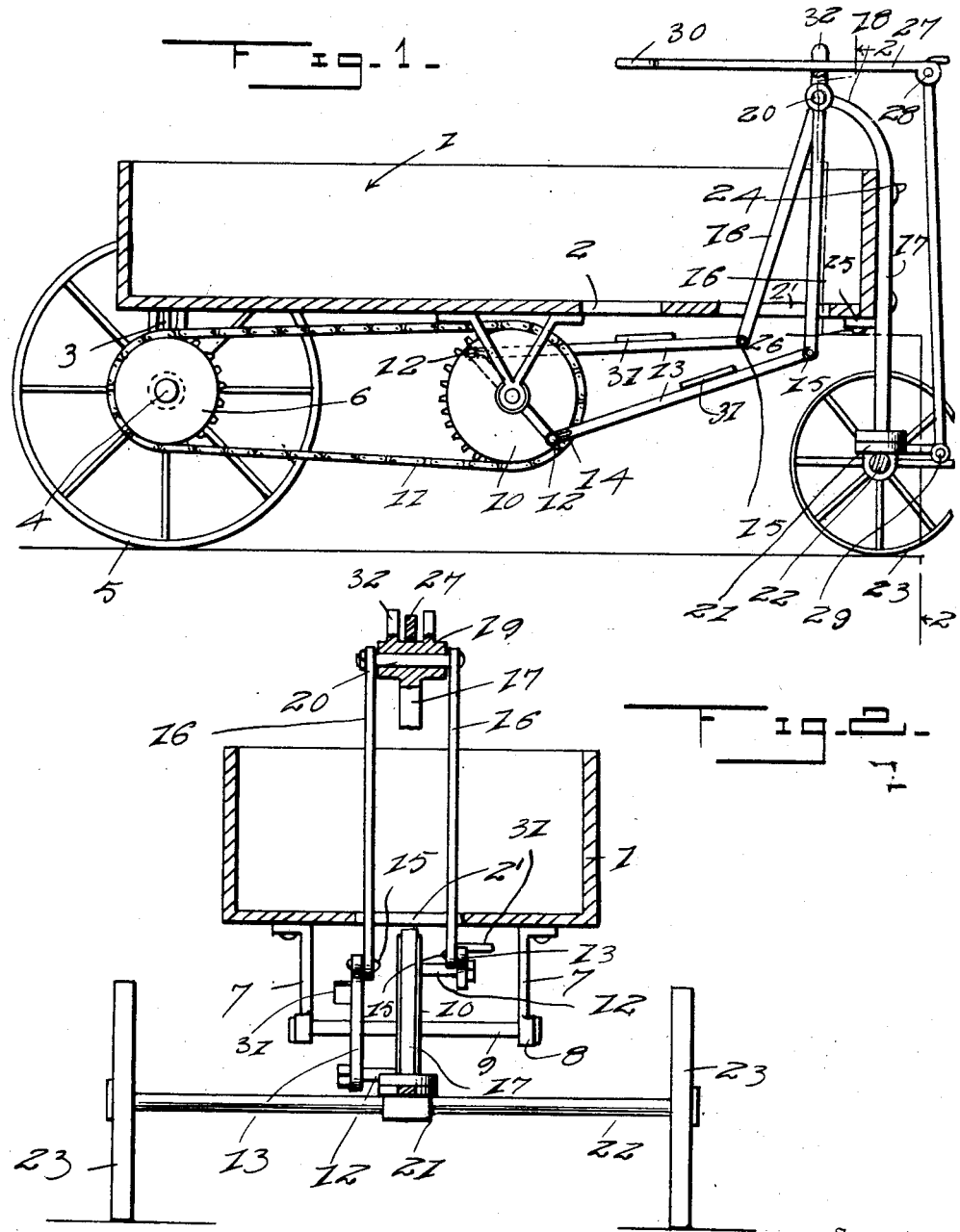

HARRISON C. NICKEY, OF HARTFORD CITY, INDIANA.

WAGON.

1,273,906.     Specification of Letters Patent.     Patented July 30, 1918.

Application filed May 11, 1917. Serial No. 167,946.

*To all whom it may concern:*

Be it known that I, HARRISON C. NICKEY, a citizen of the United States, residing at Hartford City, in the county of Blackford and State of Indiana, have invented certain new and useful Improvements in Wagons; and I do hereby declare the following to be a full, clear, and exact description of the invention, such as will enable others skilled in the art to which it appertains to make and use the same.

This invention relates to improvements in wagons.

The object of this invention is to provide a wagon equipped with novel means whereby the wagon may be propelled by the feet of the occupant, thus developing the muscles of the legs of a person propelling the wagon.

Another object of this invention is to provide a wagon with novel means whereby it may be propelled by an occupant sitting in the bottom of the wagon and also provided with novel guiding means which facilitates the guiding of the wagon by the occupant therein while the same is being propelled.

A still further object of this invention is to provide a novel propelling means for wagons, which is simple, practical, and comparatively inexpensive in construction, and one that can be manufactured and sold at a low cost.

With these and other objects in view the invention consists in the novel combination and arrangement of parts hereinafter more fully described and set forth in the claim hereto appended.

In the drawings:

Figure 1 is a longitudinal sectional view taken through a wagon body illustrating my improved propelling mechanism applied thereto, Fig. 2 is a front elevation with the wagon body in sections.

Like numerals of reference designate corresponding parts in all the figures of the drawings.

Referring more particularly to the drawing the numeral 1 designates a body of a wagon of the ordinary construction particularly the express wagon type used for children and it has its bottom provided adjacent its forward end with rectangular openings 2 and 2'. Secured to the under side of the bottom of the wagon adjacent the rear end thereof is a pair of spaced depending bearing brackets 3 in which is rotatably mounted a transversely arranged shaft 4 which has secured for rotation therewith on each end the rear wheels 5.

A sprocket wheel 6 is keyed to the shaft 4 centrally thereof for rotation therewith the purpose of which will be hereinafter more fully described.

A pair of substantially V-shaped bearing brackets 7 are secured by their leg portions which are bent angularly to the under side of the bottom of the wagon body adjacent the rear wall of the opening 2 and depend downwardly therefrom in spaced relation to one another. The lower ends of the apexes of the bearing bracket 7 terminates into the bearing collars 8 in which is journaled a shaft 9 which has secured centrally thereon for rotation therewith a sprocket wheel 10. Flexible chain 11 is turned over the sprocket wheels 6 and 10 whereby upon rotation of the sprocket wheel 10 the wheels will be rotated and the wagon moved forwardly.

A pair of shafts 12 are secured eccentrically to the sprocket wheel 10 on opposite sides thereof as illustrated and are adapted to have pivotally secured adjacent their outer ends foot treadle bars 13. The treadle bars 13 have one of their ends slotted as at 14 which slots are adapted to receive the shafts 12 therein to provide a loose connection between the shaft and bars and to permit the bars to be rotated on the crank shafts 12. The opposite ends of the bars are pivotally secured as at 15 to the links 16 which links extend upwardly through the opening 2' in the bottom of the wagon as illustrated.

A standard 17 is secured to the exterior of the forward part of the wagon body and extends above and below the frame and its upper portion is curved rearwardly as at 18 and terminates into a bearing sleeve 19 in which is rotatably mounted a pin 20 which has connected to its opposite end the free ends of the links 16, the free ends of the links 16 are pivotally secured to the opposite ends of the pins 20 to permit the treadle bars to have pressure applied thereon rotating the sprocket wheels 6 and 10 and moving the wagon forwardly.

The lower end of the bar or standard 17 has arranged thereon a fifth wheel 21 which carries the shaft 22 on the opposite ends of which is journaled the forward wheels 23.

The standard is secured to the forward end of the wagon body by bolts 24 and has secured to its rear side a lug 25 which engages the bottom of the wagon body and is secured thereto by bolts 26 thus the standard is rigidly supported to the wagon body.

A sectional handle 27 is hingedly connected together as at 28 and the free end of one section is pivotally secured to the fifth wheel 21 as at 29 the opposite section of the handle terminates into a loop 30 which constitutes a hand grip whereby the wagon may be pulled when desired.

The hinge 28 which hingedly connects the sections of the handle together is provided with a suitable snap hook structure holding the sections extended when the same is to be pulled.

The treadle bars 13 are provided on their upper sides centrally of their ends with a rectangular plate 31 which constitutes treads for receiving the foot of the occupant who is seated in the wagon so as to facilitate the rotation of the sprocket wheel 10 moving the wagon forwardly.

A pair of spaced vertical lugs 32 are formed on the exterior of the sleeve 19 on the upper side thereof and are adapted to receive therebetween the front section of the handle 27 so as to facilitate the guiding of the wagon when the same is propelled by the treadles 13, the ears preventing lateral shifting movement of the handle sections and also facilitating the turning of the fifth wheel structure for steering the front wheels.

In operation:

The person using the wagon first breaks the handle sections at the joint 28 placing one section between the ears 32, he then seats himself in the wagon and places his feet through the opening 2 and upon the plates 31 of the treadle bars 13, thus applying pressure to these treadle bars and forcing the same forwardly he rotates the sprocket wheel 10 which in turn rotates the sprocket wheel 6 thus rotating the axle 4 and wheels 5 and moving the wagon forward it being understood that he has hold of the handle portion 30 thus to facilitate the guiding of the wagon during its movement.

It will be apparent that to steer the wagon it is only necessary to place the section carrying the hand grip 30 between the ears 32 of the standard and move the same either to the right or the left which in turn will move the forward wheels in that direction and thus permit the wagon to be readily steered. It will also be apparent that when the section of the handle is raised from between the ears and extended that by virtue of the snap hook and its pivotal connection with the fifth wheel of the steering mechanism, the handle will be parallel with the wagon and may be readily propelled by pulling.

When it is desired to pull the same, first the handle sections should be lifted up from between the lugs and extended and it is ready to pull the wagon as is the usual case of ordinary express wagons.

What is claimed is:

A wagon including a body, rear wheels journaled to the body, a sprocket wheel keyed to and depending from the under side of the wagon intermediate the ends thereof, cranks secured to the sprocket wheel, treadles pivotally secured by one end to the cranks, links pivotally secured to the forward ends of the treadles and extending up through the body of the wagon at the forward end thereof, a standard secured to the forward end of the body, wheels secured to the lower end of the standard, a bearing at the upper ends of the standard, said links being pivotally secured to the bearing, means for steering the forward wheels, and said body provided with openings to permit of the movement of the links and treadles to be propelled, as and for the purpose specified.

In testimony whereof I affix my signature in presence of two witnesses.

HARRISON C. NICKEY.

Witnesses:
RUTH STEFFEY,
L. F. SPRAGUE.

Copies of this patent may be obtained for five cents each, by addressing the "Commissioner of Patents, Washington, D. C."